United States Patent
Bodin et al.

(10) Patent No.: US 7,437,432 B2
(45) Date of Patent: Oct. 14, 2008

(54) CLIENT DEVICE CONFIGURATION WITH CONFIGURATION SERVICES PROVIDERS

(75) Inventors: William Kress Bodin, Austin, TX (US); Michael John Burkhart, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 10/317,994

(22) Filed: Dec. 12, 2002

(65) Prior Publication Data

US 2004/0117466 A1 Jun. 17, 2004

(51) Int. Cl.
*G06F 15/177* (2006.01)

(52) U.S. Cl. .................... 709/220; 709/222; 709/228

(58) Field of Classification Search ............... 709/220, 709/222–223, 203, 217, 219, 228; 705/27; 717/168, 174
See application file for complete search history.

(56) References Cited

U.S. PATENT DOCUMENTS

| | | | | |
|---|---|---|---|---|
| 5,826,000 | A | 10/1998 | Hamilton | 395/182.02 |
| 5,852,722 | A * | 12/1998 | Hamilton | 709/221 |
| 5,870,610 | A | 2/1999 | Beyda | 395/712 |
| 5,991,546 | A | 11/1999 | Chen et al. | |
| 6,012,088 | A | 1/2000 | Li et al. | 709/219 |
| 6,128,729 | A | 10/2000 | Kimball et al. | 713/1 |
| 6,182,275 | B1 * | 1/2001 | Beelitz et al. | 717/175 |
| 6,263,387 | B1 | 7/2001 | Chrabaszcz | 710/103 |
| 6,286,038 | B1 | 9/2001 | Reichmeyer et al. | 709/220 |
| 6,301,012 | B1 | 10/2001 | White et al. | 358/1.15 |
| 6,314,459 | B1 | 11/2001 | Freeman | 709/220 |
| 6,336,152 | B1 | 1/2002 | Richman et al. | 710/8 |
| 6,745,239 | B1 * | 6/2004 | Hubbard | 709/220 |
| 6,760,708 | B1 * | 7/2004 | Hubbard et al. | 705/27 |
| 6,912,552 | B2 * | 6/2005 | Hubbard et al. | 707/204 |
| 6,985,876 | B1 * | 1/2006 | Lee | 705/27 |
| 2002/0026504 | A1 | 2/2002 | Lo | 709/220 |
| 2002/0035621 | A1 | 3/2002 | Zintel et al. | 709/220 |
| 2002/0069257 | A1 * | 6/2002 | Rigori et al. | 709/217 |
| 2002/0078367 | A1 | 6/2002 | Lang et al. | 713/200 |
| 2002/0108002 | A1 | 8/2002 | Gifford, Jr. et al. | 710/36 |
| 2002/0178295 | A1 | 11/2002 | Buczek et al. | |

(Continued)

FOREIGN PATENT DOCUMENTS

KR 1997-7650 2/1997

(Continued)

OTHER PUBLICATIONS

Crayford, Ian; "Fast Ethernet" Gets Plug-and-Play; IEEE, 1995; pp. 354-359.

(Continued)

*Primary Examiner*—Lashonda T Jacobs
(74) *Attorney, Agent, or Firm*—John Biggers; Justin Dillon; Biggers & Ohanian, LLP (57) ABSTRACT

Configuring a client device, including receiving, from a manufacturer, a configuration bundle for a client device, receiving, from a vendor, vendor provided configuration parameters for the client device, receiving from a user, user provided configuration parameters for the client device, and associating the vendor provided configuration parameters and the user provided configuration parameters with the configuration bundle for the client device; thereby producing an associated configuration bundle for the client device.

1 Claim, 5 Drawing Sheets

U.S. PATENT DOCUMENTS

2003/0041133 A1* 2/2003 Hiroshige et al. .......... 709/222

FOREIGN PATENT DOCUMENTS

| KR | 2001-3851 | 5/2001 |
| KR | 2001-38516 | 5/2001 |
| WO | WO 02/39257 A2 | 5/2002 |

OTHER PUBLICATIONS

Velayos, Hector, et al.; 'Requiremetns for Network Services in Brain Project'.

McAuley, A.J., et al.; 'Self-Configuring Networks;' IEEE, 2000; pp. 315-319.

IBM Technical Disclosure Bulletin; 'Automatic Configuration of a Personal Computer System;' Sep. 1989; vol. 32, No. 4B; pp. 112-115.

'Cisco Long-Reach Ethernet Solution;' Cisco Product Catalog, Sep. 2002.

Haberman, Brian; 'Home Networking with IPv6;'Oct. 19, 2000.

Method for Representing a Network Device Configuration as a Collection of Reusable, Configurable Components; RD Article No. 41594, vol. 41, No. 415; Nov. 1, 1998; Havant, UK.

* cited by examiner

CLIENT DEVICE CONFIGURATION WITH CONFIGURATION SERVICES PROVIDERS

BACKGROUND OF THE INVENTION

1. Field of the Invention

The field of the invention is data processing, or, more specifically, methods, systems, and products for configuring client devices.

2. Description of Related Art

Often when a networked client device is purchased and installed onto a network, such as a home network, the client device must be configured to operate properly. When disparate client devices using different protocols are networked together configuring these client devices often requires configuration parameters specific to the user, the network on which the client device will operate, and the client device. Current configuration techniques are often tedious and require extensive user involvement. In fact, in some complicated environments, configuration requires a truck roll with a technical installer. Many conventional configuration techniques require the user to access complicated text instructions from a home computer and wade through large amounts of technical data in order to complete the configuration process. Therefore, there is a need for an improved method of configuring a client device.

SUMMARY OF THE INVENTION

Exemplary embodiments of the invention include methods for configuring a client device. Exemplary embodiments include receiving, from a manufacturer, a configuration bundle for a client device, and receiving, from a vendor, vendor provided configuration parameters for the client device. Such embodiments include receiving, from a user, user provided configuration parameters for the client device, and associating the vendor provided configuration parameters and the user provided configuration parameters with the configuration bundle for the client device, thereby producing an associated configuration bundle for the client device.

Exemplary embodiments of the invention include downloading the associated configuration bundle to a services gateway for the user. Typical embodiments include executing the associated configuration bundle. Some embodiments include detecting the client device. Such embodiments include requesting an associated configuration bundle for the client device.

In exemplary embodiments of the invention, receiving, from a manufacturer, a configuration bundle for a client device includes storing the configuration bundle in a database. In such embodiments, the database is indexed according to a client device identifier for the client device. In typical embodiments, receiving, from a user, user provided configuration parameters for the client device includes storing the configuration parameters in a database. In exemplary embodiments, associating the vendor provided configuration parameters and the user provided configuration parameters with the configuration bundle for the client device includes retrieving the configuration bundle from a database in dependence upon a client device identifier and retrieving the user configuration parameters from a database in dependence upon a user identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for configuring a client device. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Field"—In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

"Browser" means a web browser, a communications application for locating and displaying web pages. Browsers typically comprise a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers." Microbrowsers in wireless web-enabled devices often support markup languages other than HTML, including for example, WML, the Wireless Markup Language.

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"Driver" means a program that controls a device. A device (printer, disk drive, keyboard) typically has a driver. A driver acts as translator between the device and software programs that use the device. Each device has a set of specialized commands that its driver knows. Software programs generally access devices by using generic commands. The driver, therefore, accepts generic commands from a program and then translates them into specialized commands for the device.

"HAVi" stands for 'Home Audio Video interoperability,' the name of a vendor-neutral audio-video standard particularly for home entertainment environments. HAVi allows different home entertainment and communication devices (such as VCRs, televisions, stereos, security systems, and video monitors) to be networked together and controlled from one primary device, such as a PC or television. Using IEEE 1394, the 'Firewire' specification, as the interconnection medium, HAVi allows products from different vendors to comply with one another based on defined connection and communication protocols and APIs. Services provided by HAVi's distributed application system include an addressing scheme and message transfer, lookup for discovering resources, posting and receiving local or remote events, and streaming and controlling isochronous data streams.

"HomePlug" stands for The HomePlug Powerline Alliance. HomePlug is a not-for-profit corporation formed to provide a forum for the creation of open specifications for high speed home powerline networking products and services. The HomePlug specification is designed for delivery of Internet communications and multimedia to homes through the home power outlet using powerline networking standards.

"ID" abbreviates "identification," meaning 'identification code' or identification field. It is a style of reference in this disclosure to refer to user identification codes as "user IDs." By convention in this disclosure, the field name "UserID" is used to store a user ID.

"IEEE 1394" is an external bus standard that supports data transfer rates of up to 400 Mbps (400 million bits per second). Products supporting the 1394 standard go under different names, depending on the company. Apple, which originally developed IEEE 1394, uses the trademarked name "FireWire." Other companies use other names, such as i.link and Lynx, to describe their 1394 products.

A single 1394 port can be used to connect up 63 external devices. In addition to high speed, 1394 also supports isochronous data—delivering data at a guaranteed rate. This makes it ideal for devices that need to transfer high levels of data in real-time, such as video.

"The Internet" is a global network connecting millions of computers utilizing the 'internet protocol' or 'IP' as the network layer of their networking protocol stacks. The Internet is decentralized by design. Each computer on the Internet is independent. Operators for each computer on the Internet can choose which Internet services to use and which local services to make available to the global Internet community. There are a variety of ways to access the Internet. Many online services, such as America Online, offer access to some Internet services. It is also possible to gain access through a commercial Internet Service Provider (ISP). An "internet" (uncapitalized) is any network using IP as the network layer in its network protocol stack.

'IP' refers to the 'internet protocol,' a network-layer networking protocol for computer data communications.

"IP address" means an identifier for a computer or device on an IP network. Networks using the IP protocol route messages based on the IP address of the destination. The format of an IP address is a 32-bit numeric address written as four numbers separated by periods. Each number can be zero to 255. An example of an IP address is 1.160.10.240.

"ISP" means "Internet Service Provider," a company that provides access to the Internet. For a monthly fee, an ISP provides a user identification code (often called a 'username'), a password, and an access phone number or, for wide band services, an internet protocol address, through which to access the Internet. Equipped with proper couplings for data communications, such as a modem or cable modem, users and companies can then log on to the Internet, browse the World Wide Web, and access other Internet related services such as USENET and e-mail. In servings companies, ISPs also provide a direct connection from the company's networks to the Internet.

"JAR" is an abbreviation for 'Java archive.' JAR is a file format used to bundle components used by a Java applet. JAR files simplify downloading applets, because many components (.class files, images, sounds, etc.) can be packaged into a single file. JAR also supports data compression, which further decreases download times. By convention, JAR files end with a .jar extension.

"JES" stands for Java Embedded Server. JES is a commercial implementation of OSGi that provides a framework for development, deployment, and installation of applications and services to embedded devices.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

"OSGI" refers to the Open Services Gateway Initiative, an industry organization developing specifications for services gateways, including specifications for delivery of service bundles, software middleware providing compliant data communications and services through services gateways. The Open Services Gateway specification is a Java based application layer framework that gives service providers, network operator device makers, and appliance manufacturer's vendor neutral application and device layer APIs and functions.

"Server" in this specification refers to a computer or device comprising automated computing machinery on a network that manages resources and requests for access to resources. A "web server," or "HTTP server," in particular is a server that communicates with browsers by means of HTTP in order to manage and make available to networked computers documents in markup languages like HTML, digital objects, and other resources. A "DMS server," in particular is a server that communicates with services gateways to provide service bundles to the services gateways.

"SMF" stands for "Service Management Framework™" available from IBM®. SMF is a standards-based architecture that is designed to be compliant with specifications developed by the cross-industry Open Services Gateway Initiative (OSGi). SMF is a commercial implementation of OSGi for management of network delivered applications on services gateways.

'TCP' refers to the 'Transmission Control Protocol,' a transport-layer networking protocol for networked computer data communications. TCP provides a so-called 'reliable' communications protocol in which a message is broken into packets which are communicated to the message's destination and reassembled into the message completely and in correct sequence. TCP is so often used with IP as its underlying network protocol layer that the two are often spoken of together as the TCP/IP protocol suite.

"TCP/IP" means the Transmission Control Protocol (TCP) and the Internet Protocol (IP) operating together. TCP/IP is a packet switching protocol suite. TCP establishes a virtual connection between a data source and a data destination. IP specifies that data will be sent from the source to the destination in packets and IP specifies the addressing scheme of the source and the destination. TCP monitors the delivery of the data and the order in which the packets are delivered.

"USB" is an abbreviation for "universal serial bus." USB is an external bus standard that supports data transfer rates of 12 Mbps. A single USB port can be used to connect up to 127 peripheral devices, such as mice, modems, and keyboards. USB also supports Plug-and-Play installation and hot plugging.

"WAP" refers to the Wireless Application Protocol, a protocol for use with handheld wireless devices. Examples of wireless devices useful with WAP include mobile phones, pagers, two-way radios, and hand-held computers. WAP supports many wireless networks, and WAP is supported by many operating systems. Operating systems specifically engineered for handheld devices include PalmOS, EPOC, Windows CE, FLEXOS, OS/9, and JavaOS. WAP devices that use displays and access the Internet run "microbrowsers." The micrbrowsers use small file sizes that can accommodate the low memory constraints of handheld devices and the low-bandwidth constraints of wireless networks.

"World Wide Web," or more simply "the web," refers to a system of internet protocol ("IP") servers that support specially formatted documents, documents formatted in markup languages such as HTML (HyperText Markup Language), XML (eXtensible Markup Language), WML (Wireless Markup Language), or HDML (Handheld Device Markup Language). The term "Web" is used in this specification also to refer to any server or connected group or interconnected groups of servers that implement a hyperlinking protocol, such as HTTP (HyperText Transfer Protocol) or WAP (Wireless Access Protocol), in support of URIs and documents in markup languages, regardless of whether such servers or groups of servers are coupled to the World Wide Web as such.

Detailed Description

Figure 1:
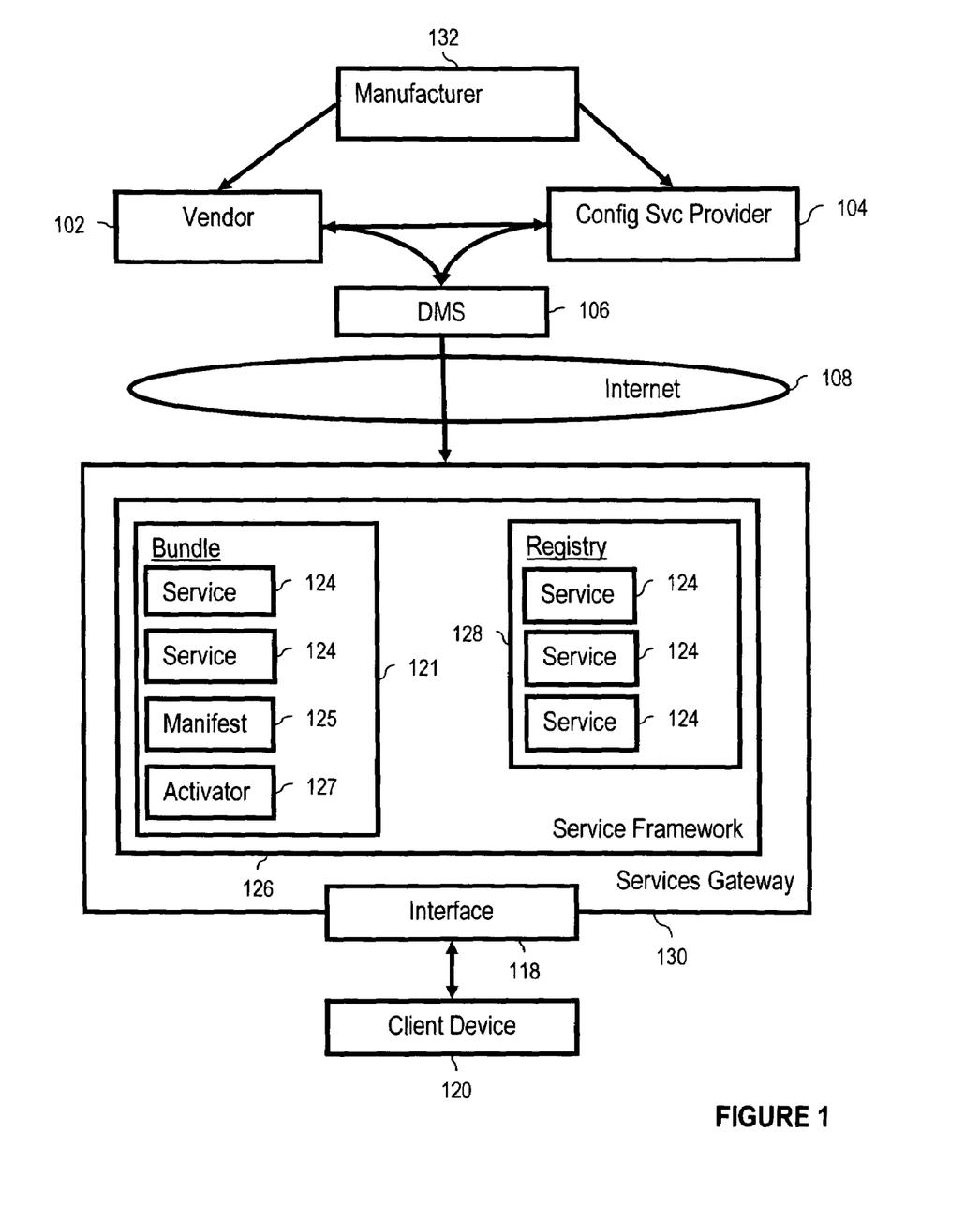
FIG. 1 is a block diagram illustrating information handling architecture and various entities useful in implementing methods of configuring a client device in accordance with methods of the present invention.

FIG. 1 is a block diagram illustrating an exemplary information handling architecture and various entities useful in implementing methods of configuring a client device in accordance with various embodiments of the present invention. The exemplary architecture of FIG. 1 includes a client device (120) to be configured. A client device (120) can be any configurable device, although in many typical embodiments of the present invention, client devices (120) are devices capable of being networked on a LAN, such as a home network, or any other network as will occur to those of skill in the art. Examples of client devices (120) to be configured include printers, a dishwasher, a DVD player, a coffeepot, or any other device that will occur to those of skill in the art.

In the exemplary architecture of FIG. 1, a client device (120) is coupled for data communication with a services gateway (130). The services gateway (130) is coupled for data communication with the internet (108). The services gateway (130) provides access for the client device (120), and any LAN on which the client device (1020 is operating, to a WAN such as the Internet.

A services gateway (130) is in some exemplary architectures an OSGi compatible services gateway (130). While exemplary embodiments of methods for configuring a client device are described in this specification using OSGi, many other applications and frameworks, will work to implement the methods of configuring a client device according to the present invention, and are therefore, also well within the scope of the present invention. Commercial implementations of OSGi, such as JES and SMF, are also useful in implementing methods of the present invention.

OSGi Stands for 'Open Services Gateway Initiative.' The OSGi specification is a Java based application layer framework that provides vendor neutral application and device layer APIs and functions for various devices using arbitrary communication protocols operating in networks in homes, cars, and other environments. OSGi works with a variety of networking technologies like Ethernet, Bluetooth, theHome, Audio and Video Interoperability (HAVi) standard, IEEE 1394, Universal Serial Bus (USB), WAP, and powerline communication systems, including the Home Powerline Alliance (HomePlug). The OSGi specification is available for free download from the OSGi website at www.osgi.org.

The services gateway of FIG. 1 includes a service framework (126). In many example embodiments the service framework is an OSGi service framework (126). An OSGi service framework (126) is written in Java and therefore, typically runs on a Java Virtual Machine (JVM). In OSGi, the service framework (126) of FIG. 1 is a hosting platform for running 'services' (124).

Services (124) are the main building blocks for creating applications in the OSGi. A service (124) is a group of Java classes and interfaces that implement a certain feature. The OSGi specification provides a number of standard services. For example, OSGi provides a standard HTTP service that creates a web server that can respond to requests from HTTP clients.

OSGi also provides a set of standard services called the Device Access Specification. The Device Access Specification ("AS") provides services to identify a device connected to the services gateway, search for a driver for that device, and install the driver for the device.

Services (124) in OSGi are packaged with other files, images, and resources that the services (124) need for execution in a 'bundle,' such as the bundle (121) of FIG. 1. A bundle (121) is a Java archive (JAR) file including one or more services (124), an activator class (127), and a manifest file (125). An activator class (127) is a Java class that the service framework (126) uses to start and stop a bundle. A manifest file (125) is a standard text file that describes the contents of the bundle (121).

The services framework (126) in OSGi also includes a service registry (128). The service registry (128) includes the service's name and an instance of a class that implements the service for each bundle (121) installed on the framework (126) and registered with the service registry (128). A bundle (121) may request services that are not included in the bundle (121), but are registered on the framework service registry (128). To find a service, a bundle (121) performs a query on the framework's service registry (128).

The exemplary entities of FIG. 1 also include a Device Management Server ('DMS') (106) coupled for data communications with the services gateway (130) though the internet (108), the World Wide Web, or any WAN. The DMS is a server specifically designed to provide, retrieve, or otherwise deploy bundles to the services gateway (130). In many typical examples, a DMS agent provides protocols for receiving requests for bundles from a gateway, authenticating the gateway, retrieving a requested bundle, and providing the requested bundle to the services gateway.

The exemplary entities of FIG. 1 include a Configuration Services Provider ('CSP') (104). A CSP (104) is a service provider that obtains configuration bundles for client devices and provides them to users. A user is a subscriber or customer of a CSP. A CSP receives configuration parameters from users. When a user or vendor notifies a CSP of the purchase of a client device that needs to be configured, the CSP (104) provides an associated configuration bundle for the client device. An associated configuration bundle is a configuration bundle for the client device that has within the bundle configuration parameters necessary for the configuration on the user's services gateway (130). The CSP of FIG. 1 downloads the configuration bundle to the user's services gateway through a DMS. The associated configuration bundle is executed on the services gateway to configure the client device.

The exemplary entities of FIG. 1 include a vendor (102). The vendor (102) sells or otherwise provides client devices (120) to the user. In examples of methods of configuring a client device, the vendor (102) also sells or otherwise provides to a user configuration bundles for the client device. In some example embodiments of the present invention, the vendor obtains the configuration bundles form a manufacturer of configuration bundles (132).

The exemplary entities of FIG. 1 also include a manufacturer (132). The manufacturer (132) of FIG. 1 is a manufacturer of configuration bundles for use with methods of configuring a client device (120) according to the present invention. The manufacturer (132) of configuration bundles for the client device is in some instances the manufacturer of the client device (120) itself. However, the manufacturer (132) of a configuration bundle may be a third-party manufacturer of configuration bundles who did not manufacture the client device.

Figure 2:
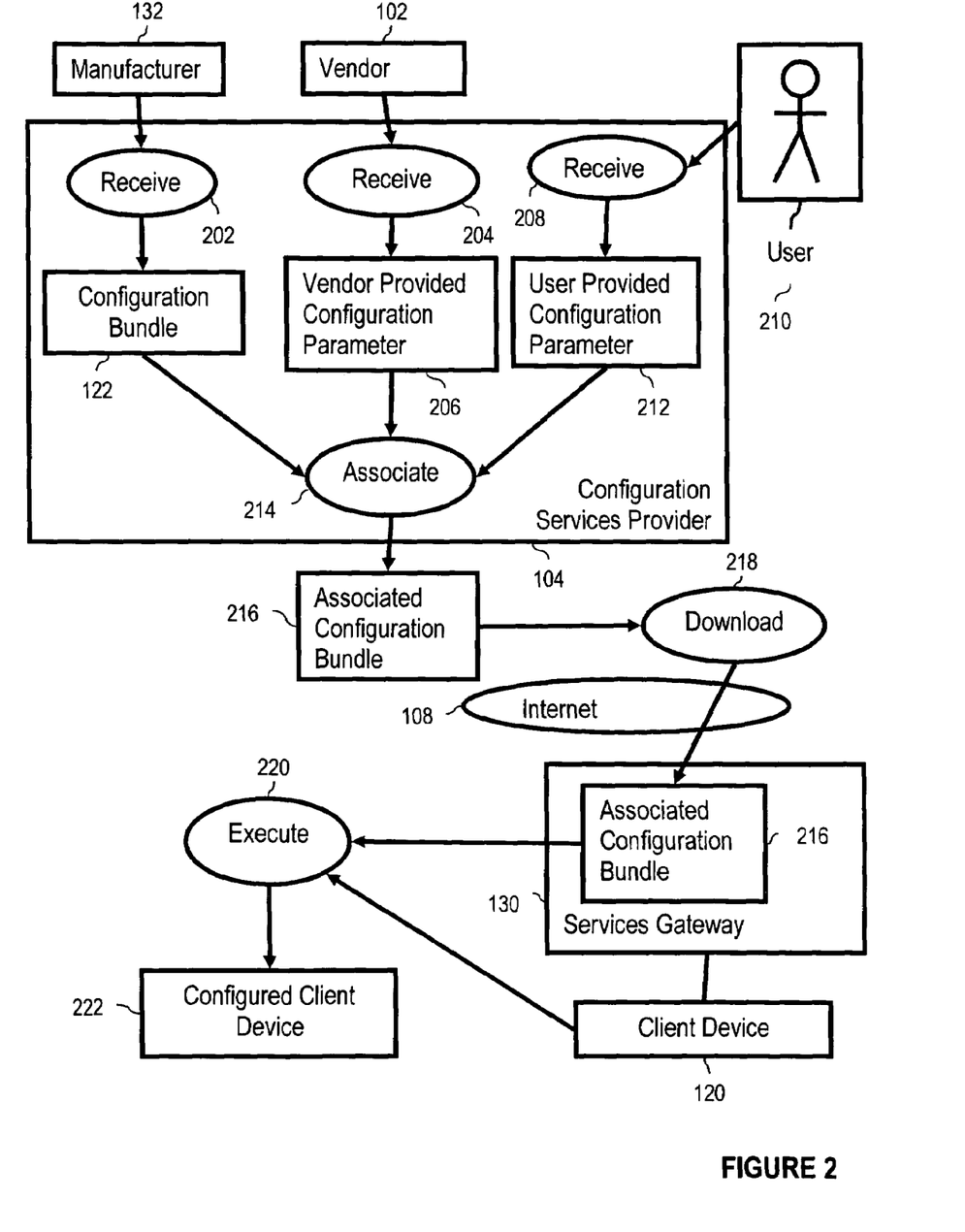
FIG. 2 is a dataflow diagram illustrating an exemplary method of configuring a client device.

FIG. 2 is a data flow diagram illustrating an exemplary method for configuring a client device. The method of FIG. 2 includes receiving, (202) from a manufacturer (132), a configuration bundle (122) for a client device (120). The manufacturer (132) is a manufacturer of the configuration bundle (122) for the client device (120). In many exemplary methods for configuring client devices according to embodiments of the present invention, a manufacturer (132) of a configuration bundle (122) is the manufacturer of the client device (120). However, in other examples, the manufacturer (132) of the configuration bundle may not manufacture the client device (120).

In the example of FIG. 2, the configuration bundle (122) includes services, computer code, and other resources for configuring the client device (120) in accordance with methods of the present invention. In some cases, the configuration bundle (122) may include a driver for the client device (120). In some examples of configuring a client device according to methods of the present invention, the configuration bundle (122) is an OSGi bundle including services for configuring the client device. The OSGi configuration bundle is executed on an OSGi services gateway to configure the client device. Because the configuration bundle (122) is designed to configure a specific client device (120), in many examples, various configuration bundles (122) have various designs according to the client device the configuration bundle is designed to configure, the network on which the client device (120) will operate, the services gateway to which the configuration bundle (122) will be deployed and executed, or any other factor that will occur to those of skill in the art.

In the method of FIG. 2, receiving (202) the configuration bundle (122) for the client device (120) is carried out by a CSP (104). The CSP receives configuration bundles (122) for the client device (120) from the manufacturer (132) for a user (210). A user (210) is typically a subscriber with the CSP (104). When the user (210) purchases or obtains a client device (120) to be configured, the CSP (104) provides the appropriate configuration bundle (122) to the user. A user (210) may request the configuration bundle for the client device from the CSP (104) by calling the CSP, sending the CSP an email, or any other method of requesting the CSP of the new client device to be configured. Alternately, the vendor (102) of the client device (102) notifies the user's CSP (104) of the purchase of the client device (120).

In some examples of the method of FIG. 2, receiving, (202) from a manufacturer (132), a configuration bundle (122) for a client device (120) includes individually downloading the configuration bundle (122) from, for example, a manufacturer's website. Alternatively, receiving, (202) from a manufacturer (132), a configuration bundle (122) for a client device (120) includes receiving configuration bundles as a complete database of configuration bundles indexed, for example, by make, model, or client device serial number. In many cases, the database is stored on a compact disc, or other form of non-volatile computer memory. Receiving, (202) from a manufacturer (132), a configuration bundle (122) for a client device (120) also includes receiving updates to configuration bundles (122) previously received by the CSP (104).

The method of FIG. 2 includes receiving, (204) from a vendor (102), vendor provided configuration parameters (206) for the client device (120). A vendor (102) is a seller, retailer, or provider of the client device (120) to the user. In many examples according to methods of the present invention, the vender provided configuration parameters (206) include a client device identifier. A client identifier sufficiently identifies the client device, such that the appropriate configuration bundle may be received, by for example, a CSP. Examples of client device identifiers are manufacturer's name and manufacturer's model number, a serial number, or any other client device identifier that will occur to those of skill in the art.

In the method of FIG. 2, receiving, (204) from a vendor (102), vendor provided configuration parameters (206) for the client device (120) is carried out by a CSP (104). In one example, a CSP (104) receives vendor provided configuration parameters (206), such as a client identifier identifying the client device (120) purchased by a user (210), from the vendor (102) at the point-of-sale, by receiving an email, telephone call, or any other method of receiving vendor provided configuration parameters (206) that will occur to those of skill in the art.

Consider an example of a vendor (102) operating a website. A user (210) purchases a client device (120) from the vendor (102) through the vendor's website. During the purchase, a vendor's (102) website includes a screen requesting contact information for the user's CSP (104). Upon completion of the purchase, the vendor (102) provides vendor provided configuration parameters (206) to the CSP (104). In this way, the vendor (102) provides vendor provided configuration parameters (206) to the CSP (104) automatically when the user purchases the client device (120).

The method of FIG. 2 includes receiving, (208) from a user (210), user provided configuration parameters (212) for the client device (120). User provided configuration parameters (212) typically include configuration parameters known or available to the user (134) that concern the user's services gateway, network, or other configuration parameters that define context in which the client device (120) will operate. Examples of user provided configuration parameters (212) include a user's LAN mask, a user's IP default gateway address, a user's IP address, a user's LAN name, a user's DMS name, a users link type (Ethernet, Bluetooth, 802.11), wireless network name, wireless encryption key, or any other user provided configuration parameters that will occur to those of skill in the art.

In many examples of methods of configuring a client device according to the present invention, receiving (208) from a user (210), user provided configuration parameters (212) is carried out by a CSP (104). A CSP (104) receives the user provided configuration parameters one time and stores the user provided configuration parameters in a database. The CSP maintains the user provided configuration parameters for the user. When a user (210) subsequently purchases a client device (120), the user provided configuration parameters (212) are available in the CSP's database. Configuration of the client device, therefore, is carried out without requiring additional user provided configuration parameters.

The method of FIG. 2 includes associating (214) the vendor provided configuration parameters (206) and the user provided configuration parameters (212) with the configuration bundle (122) for the client device (120). Associating (214) the vendor provided configuration parameters (206) and the user provided configuration parameters (212) results in an associated configuration bundle (216). An associated configuration bundle (214) is a configuration bundle having the appropriate configuration parameters such that when deployed to the user's services gateway, and when executed, the associated configuration bundle configures the client device.

When the user provided configuration parameters (212) and the vendor provided configuration parameters have been associated with the configuration bundle, the associated configuration bundle is ready for deployment to the user's services gateway. In many cases, more than one configuration bundle are associated to create a complete set of associated configuration bundles, such that when the set of configuration bundles are deployed onto the user's services gateway and executed, the user's client device is configured.

In the method of FIG. 2, associating (214) the vendor provided configuration parameters (206) and the user provided configuration parameters (212) with the configuration bundle (122) for the client device (120) is carried out by a CSP. In some examples, the CSP receives a notification that the user (210) has purchased or otherwise obtained a client device (120). The CSP receives the vendor provided configuration parameters (206), such as a client device identifier. The CSP receives the appropriate configuration bundle (122) for the client device (120) from a manufacturer. The CSP may then retrieve the user provided configuration parameters (212) from a database maintained by the CSP. The CSP then associates the vendor provided configuration parameters (206) and the user provided configuration parameters (212) with the configuration bundle (122) for the client device (120).

The method of FIG. 2 includes downloading (218) the associated configuration bundle (216) to a services gateway (130) for the user (210). In some examples of the method of FIG. 2, the downloading (218) the associated configuration bundle (216) includes pushing the associated configuration bundle (216) to the services gateway (130) for the user when the user provided configuration parameters (212) and the vendor provided configuration parameters (206) are associated with the configuration bundle (122). In these examples, the associated configuration bundles (216) are ready for execution on the services gateway (130) for the user. In some examples, the associated configuration bundle (216) is pushed to the services gateway through a DMS specifically designed to provide bundles to services gateways.

In an alternative example, the associated configuration bundle is downloaded to a DMS and the DMS stores the associated configuration bundle (216) or stored at the CSP, until a user or a user's services gateway (130) requests the associated configuration bundle (216). In some examples, the user's services gateway requests the associated configuration bundle when the services gateway detects that the client device (120) is connected to the services gateway (130).

The method of FIG. 2 includes executing (220) the associated configuration bundle (216). Executing (220) the associated configuration results in a configured client device (222). In many cases, the configuration bundle is executed automatically when the client device is detected on the services gateway. In other examples, executing (220) the associated configuration bundle (216) includes receiving an instruction from the user to execute the configuration bundle. Using a web browser installed on a computer connected to the services gateway, a user may through a series of instruction screens instruct the services gateway to execute the associated configuration bundle. In many embodiments, a services gateway according to the present invention has installed directly upon it no user interface hardware, no terminal screen, no keyboard, no mouse, although such services gateways do often support HTTP interfaces to services on the gateway. In such embodiments, a user can access HTTP screens on the gateway by logging on to a browser on a personal computer or other client device that does support user interface hardware and is coupled to the gateway through a LAN and directing the browser to the services gateway's IP address on the LAN.

Figure 3:
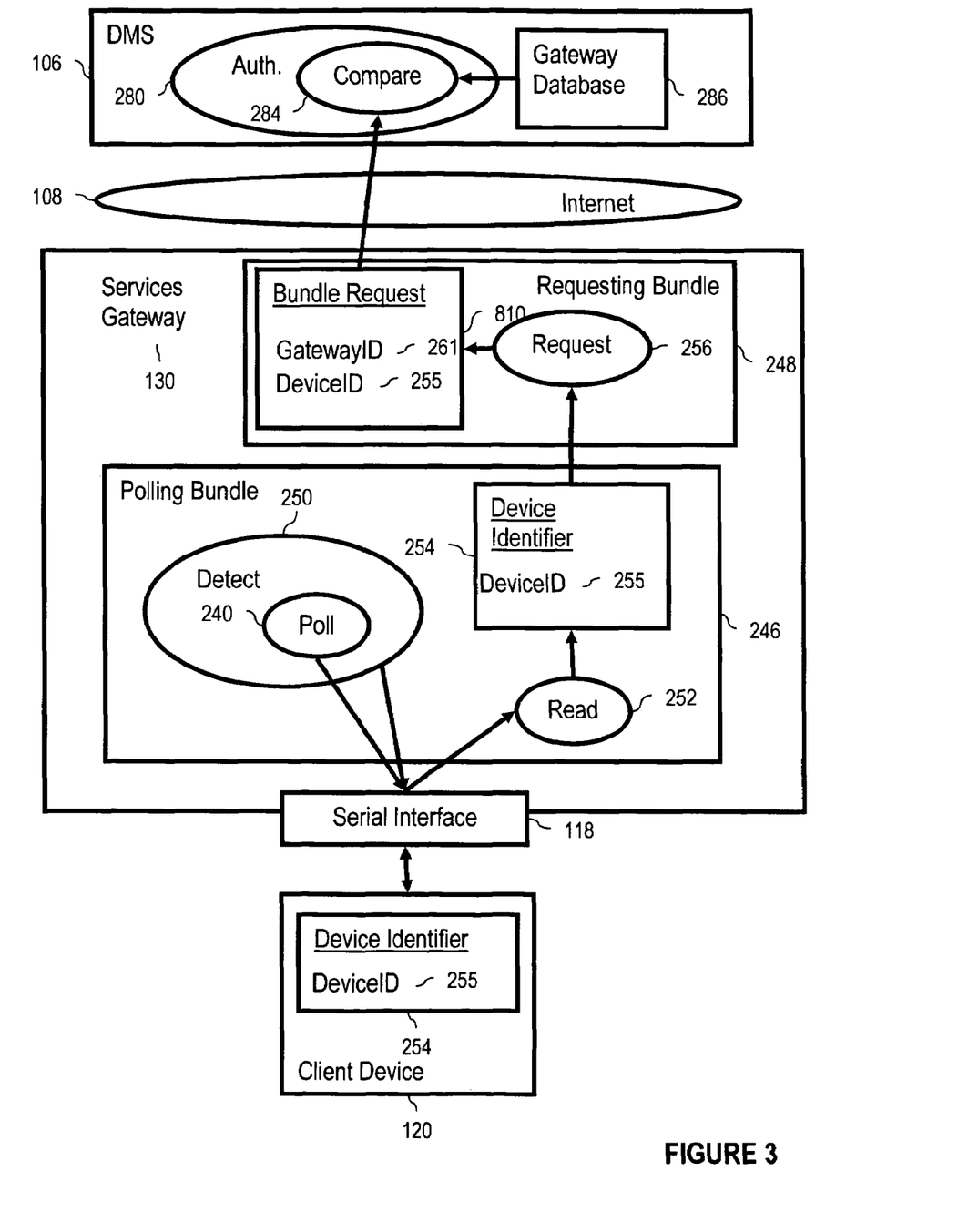
FIG. 3 is a dataflow diagram illustrating an exemplary method of detecting a client device and requesting an associated configuration bundle.

FIG. 3 is a data flow diagram illustrating an exemplary method of detecting (250) a client device (120) and requesting (242) an associated configuration bundle (242) for the client device (120). In the method of FIG. 3, detecting a client device (120) includes polling (240) a serial interface (118) for the connection of a client device (120). Polling (240) a serial interface (118) means periodically checking the serial interface for the connection of a device.

In the method of FIG. 3, detecting (250) a client device (250) is carried out through a polling bundle (246). In some example embodiments, the polling bundle (246) is an OSGi bundle. An OSGi framework provides standard services in the DAS for checking for the connection of devices on the services gateway (130). In some examples, the polling bundle (246) includes specifically programmed polling services within the bundle. In alternative examples, the polling bundles queries a services registry on an OSGi framework operating on the services gateway to identify standard OSGi services for checking for the connection of a device on the services gateway. In the example of FIG. 3, the polling bundle (246) uses the OSGi standard services to poll (240) the serial interface (118) and detect the client device (120).

The method of FIG. 3 includes reading (254) a client device identifier (254) from the client device (120) when polling detects a client device connected to a serial interface. A client device identifier (254) is any identification that sufficiently identifies the client device such that an appropriate configuration bundle for the client device may be obtained and executed. Exemplary client device identifiers include manufacturer name, model name, serial number, or any other client device identifier as will occur to those of skill in the art.

The client device identifier may be represented in data by a record such as the client device identifier record (254) of FIG. 3. The client device identifier record (254) is stored in non-volatile memory on the client device (120). The client device identifier record (254) includes a deviceID field (255) representing a serial number, make and model, or any other identification of the device that will occur to those of skill in the art.

In method of FIG. 3, a polling bundle (246) carries out reading (252) a client device identifier (254) from the client device (120). In some example embodiments, the polling bundle (246) is an OSGi bundle. An OSGi framework provides standard services in a DAS for reading device identifiers from a device connected to the services gateway. In some exemplary methods of detecting client devices and requesting configuration bundles, a polling bundle (246) includes specifically programmed services within the bundle to read the client device identifier. In alternative examples, the polling bundles queries a services registry on an OSGi framework operating on the services gateway to identify standard OSGi services for reading a client device identifier. In such embodiments, the polling bundle (246) then uses the OSGi standard services to read a client device identifier from the client device.

A DAS in an OSGi framework often also provides standard services to identify and install a driver for the client device. In embodiments that utilize such DAS services, when a polling bundle (246) detects a client device (120) and identifies the client device (120), the polling bundle queries the service registry on the service framework of the services gateway to identify standard services to obtain and install a driver to facilitate communication between the services gateway and the client device.

In some exemplary methods of detecting client devices and requesting configuration bundles, the associated configuration bundle for the client device is pushed onto the services gateway (120) for the user. In such exemplary embodiments, requesting (256) the associated configuration bundle includes requesting the associated configuration bundle stored within the services gateway. In other exemplary embodiments, where the associated configuration bundle is not pushed onto the services gateway (130), requesting (256) an associated configuration bundle includes requesting the associated configuration bundle from a DMS.

A request for an associated configuration bundle can be represented in data as a record such as, for example, the bundle request record (810) of FIG. 3. The bundle request record (810) includes a deviceID field (255) identifying the client device to be configured. The bundle request record (810) also includes a gatewayID field (261) identifying the gateway requesting the associated configuration bundle. In some examples, the gatewayID and the DeviceID together uniquely identify the associated configuration bundle for the device. In other example, the bundle request record includes a userID identifying the user.

Requesting an associated configuration, in many embodiments of the present invention, is carried out by a requesting bundle, such as the requesting bundle (242) of FIG. 3. In some exemplary embodiments according to the present invention, the requesting bundle (242) is an OSGi bundle including services capable of sending a request for an associated configuration bundle to a DMS. OSGi provides a standard HTTP service. In some examples, a requesting bundle (242) sends a bundle request to the DMS as a HTML document in an HTTP message.

The method of FIG. 3 includes authenticating (280) the services gateway (130). Authenticating the gateway can be carried out, for example, by comparing (284) the gatewayID field (261) of the bundle request record (810) with a gateway database (286). In the method of FIG. 3, authenticating (280) the services gateway (130) is carried out by a DMS. The DMS authenticates the services gateway by comparing the services gateway identifier with a database of gateway identifiers registered with the DMS.

When the services gateway is authenticated, the DMS identifies the associated configuration bundle for the client device stored on the DMS. The DMS identifies an associated configuration bundle for the client device in dependence upon the deviceID field (255) and the gatewayID field (261) of the bundle request record (810). The DMS downloads the identified associated configuration bundle to the services gateway for execution. Alternatively, the DMS requests the associated configuration bundle from the user's CSP. The DMS receives the associated configuration bundle from the CSP and downloads the associated configuration bundle to the user's services gateway.

Figure 4:
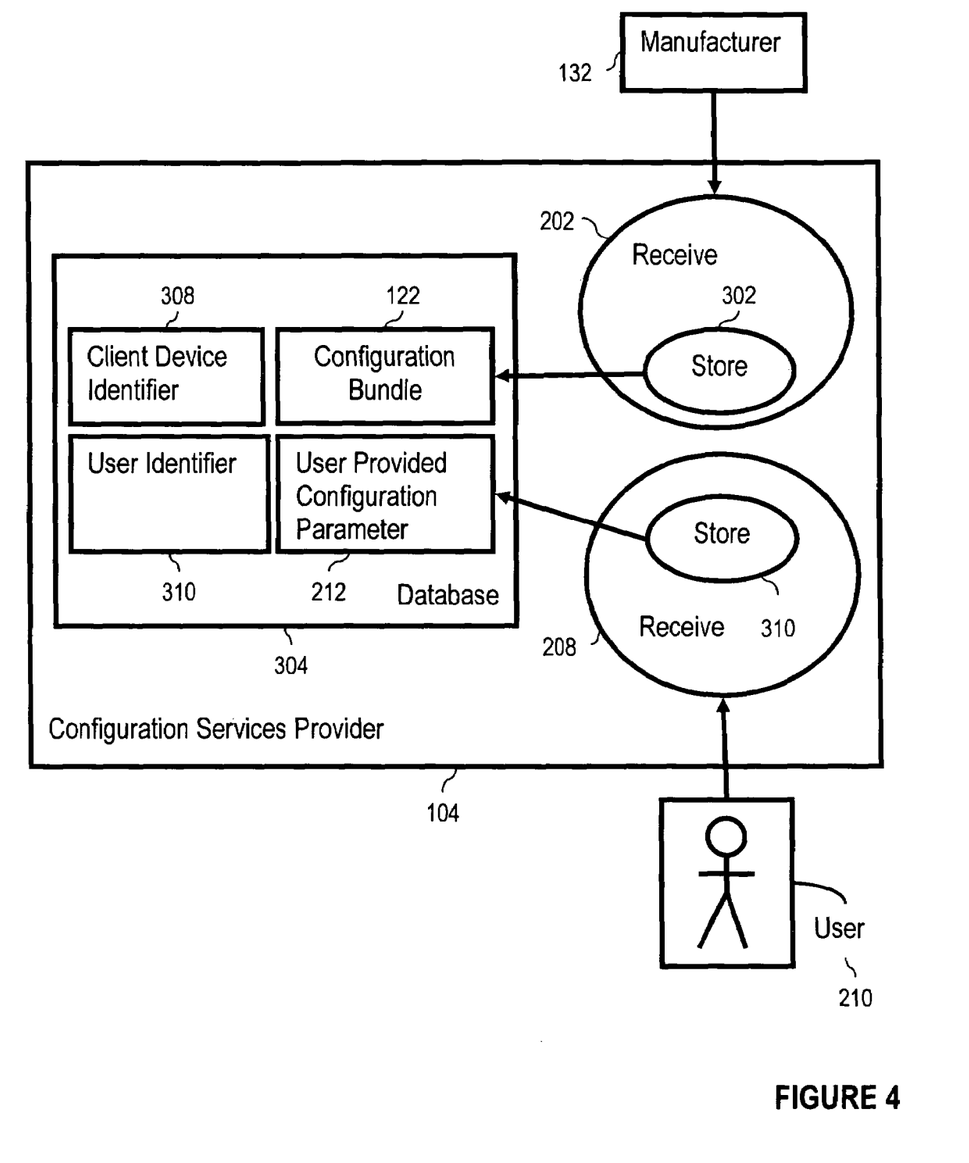
FIG. 4 is a dataflow diagram illustrating an exemplary method of receiving, from a manufacturer, a configuration bundle and receiving, from a user, user provided configuration parameters.

FIG. 4 is a data flow diagram illustrating a method of receiving (202), from a manufacturer (132), a configuration bundle (132) and receiving (208), from a user (210), user provided configuration parameters (212) for the client device. In the method of FIG. 4, receiving (202), from a manufacturer (132), a configuration bundle (132) for a client device (120) includes storing (302) the configuration bundle (132) in a database (304).

In the method of FIG. 4, storing (302) the configuration bundle in a database is carried out by a CSP (104). A CSP (104) receives (202) the configuration bundle from the manufacturer (132) and stores the configuration bundles in a database (304. In one example, a CSP receives configuration bundles from many manufacturers regardless the CSP's users. The CSP maintains a current database of all the configuration bundles for all the manufacturers that the service provider supports.

In the database (304) of FIG. 4, the configuration bundles (122) are indexed according to client device identifier (308). Examples of client device identifiers (308) include manufacturer name and model number, serial number or any other client device identifier that will occur to those of skill in the art. By indexing the database (304) by client device identifier (308) the CSP can retrieve the appropriate configuration bundle for the client device to be configured when the CSP is notified of the client device in need of configuration.

In the method of FIG. 4, receiving (208), from a user (210), user provided configuration parameters (212) for the client device includes storing (310) the configuration parameters (212) in a database (304). In many examples of the method of the present invention, storing (310) the configuration parameters (212) in a database (304) is carried out by a CSP. The CSP receives configuration parameters from a user of the configuration services. The CSP receives the user provided configuration parameters one time and stores the user provided configuration parameters.

By storing (310) user provided configuration parameters (212), the CSP automates the configuration for a user reducing the user's involvement in configuration with each additional client device (120) on the user's gateway. Upon receipt of the vendor provided configuration parameters, for example, a client device identifier, the CSP can retrieve the appropriate configuration bundle and the user provided configuration parameters without further user intervention.

Figure 5:
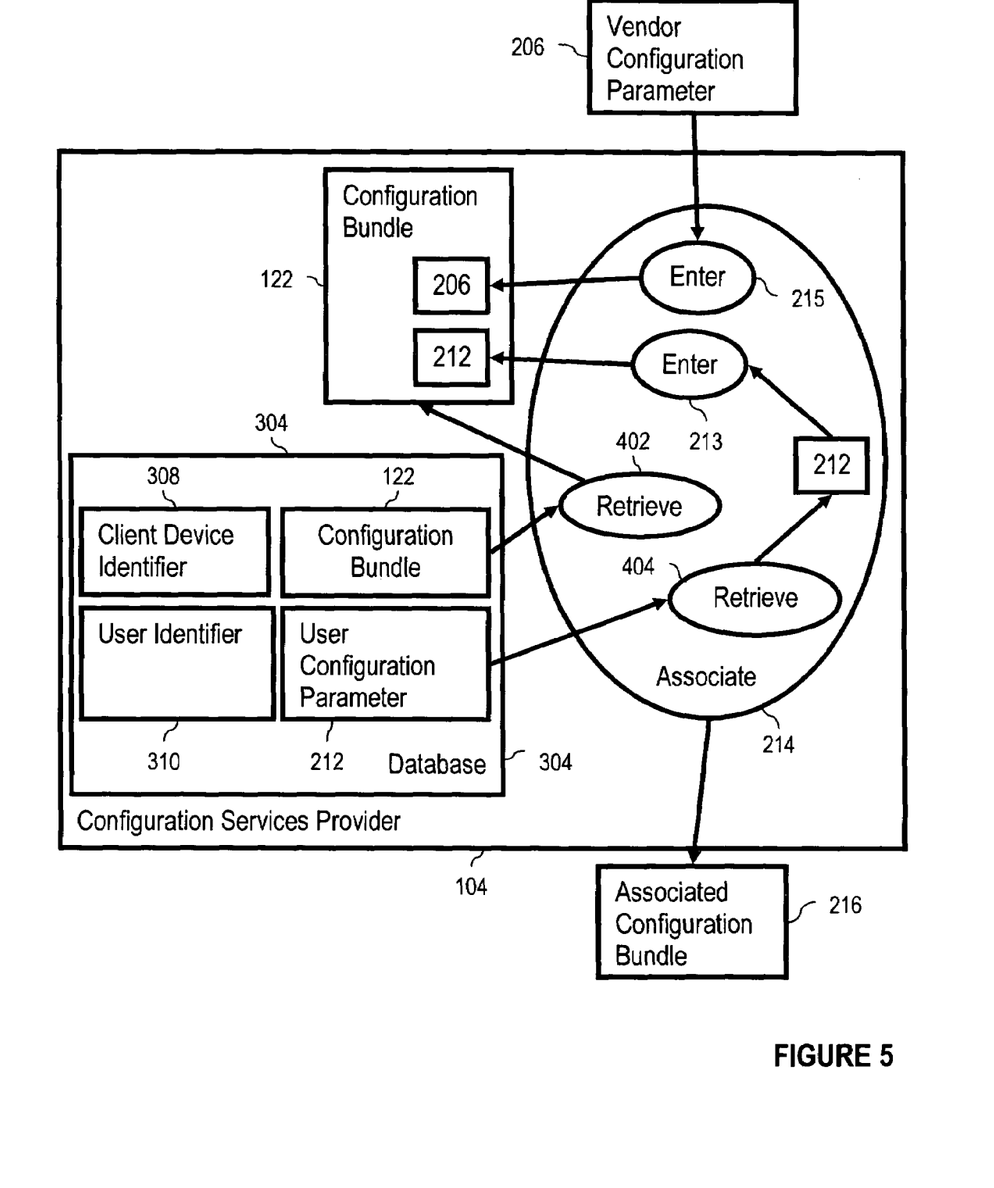
FIG. 5 is a dataflow diagram illustrating an exemplary method of associating vendor provided configuration parameters and the user provided configuration parameters with the configuration bundle for the client device.

FIG. 5 is a data flow diagram illustrating a method of associating (214) vendor provided configuration parameters (206) and user provided configuration parameters (212) with the configuration bundle (122). In the method of FIG. 5, associating (214) the vendor provided configuration parameters (206) and the user provided configuration parameters (206) with the configuration bundle (122) for the client device (120) includes retrieving (402) the configuration bundle (122) from a database (304) in dependence upon a client device identifier (308) and retrieving (404) the user configuration parameters (212) from a database (304) in dependence upon a user identifier (310).

In the method of FIG. 5, associating (214) the vendor provided configuration parameters (206) and the user provided configuration parameters (212) with the configuration bundle (122) includes entering (213) the user provided configuration parameters (212) into the configuration bundle received from the manufacturer (134). Associating (214) the vendor provided configuration parameters (206) and the user provided configuration parameters (212) with the configuration bundle (122) also includes entering (215) and vendor provided configuration parameters (206) into the configuration bundle (122) received from the manufacturer (132).

In method of FIG. 5, associating (214) the vendor provided configuration parameters (206) and the user provided configuration parameters (212) with the configuration bundle (122) is carried out by a CSP (104). In one example, entering (213) the user provided configuration parameters (212) into the configuration bundle received from the manufacturer (134) and entering (215) and vendor provided configuration parameters (206) into the configuration bundle (122) received from the manufacturer (132) is carried out through a website run by the CSP (104). Upon purchasing a client device (120) a vendor logs onto the CSP's website. The vendor (102) provides the vendor provided configuration parameters (206) through the web site and the CSP (104) enters the vendor provided configuration parameters (206) into the configuration bundle (122) for the client device (120). The vendor (102) also identifies the user, by userID, name, or any other user identifier (310). The CSP (104) retrieves the user provided configuration parameters (212) stored in a database indexed by userID, name, or any other user identifier and enters the user provided configuration parameters (212) into the configuration bundle (122) for the client device (120).

If the CSP (104) has not received the user provided configuration parameters (212) from the user (210), the CSP can receive the user provided configuration parameters (212) from the user through the CSP's website. The CSP (104) receives the user provided configuration parameters (212) through the website, and enters the user provided configuration parameters (212) into the configuration bundle (122) for the client device (120).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for configuring a client device, the method comprising the steps of:

requesting, by a user a configuration bundle for the client device from a Configuration Services Provider (CSP);

receiving, by the CSP from the user, user provided configuration parameters for the client device wherein the user provided configuration parameters for the client device are stored in CSP database according to a user identifier;

receiving, by the CSP automatically from a vendor, vendor provided configuration parameters for the client device wherein the vendor provided configuration parameters include a client device identifier;

receiving, by the CSP from a manufacturer, a configuration bundle for a client device wherein the configuration bundle for the client device is stored in the CSP database, wherein the CSP database is indexed according to the client device identifier for the client device;

associating, by the CSP, the vendor provided configuration parameters and the user provided configuration parameters with the configuration bundle for the client device wherein associating the vendor provided configuration parameters and the user provided configuration parameters with the configuration bundle for the client device comprises retrieving the configuration bundle from the CSP database in dependence upon the client device identifier and retrieving the user configuration parameters from the CSP database in dependence upon the user identifier, thereby producing an associated configuration bundle for the client device;

detecting, by a services gateway, a client device and requesting an associated configuration bundle for the client device from the CSP;

downloading, by the CSP to the services gateway, the associated configuration bundle for the user; and executing the associated configuration bundle on the services gateway to configure the client device.

* * * * *